United States Patent [19]

Guffey et al.

[11] 4,302,234
[45] Nov. 24, 1981

[54] METHOD AND APPARATUS FOR FORMING MINERAL FIBERS

[75] Inventors: Larry J. Guffey, Heath, Ohio; William W. Schultz, Evanston, Ill.

[73] Assignee: Owens-Corning Fiberglass Corporation, Toledo, Ohio

[21] Appl. No.: 163,255

[22] Filed: Jun. 26, 1980

[51] Int. Cl.³ ............................................. C03B 37/04
[52] U.S. Cl. ............................................. 65/14; 65/6
[58] Field of Search ........................... 65/4 R, 5–7, 65/14–16

[56] References Cited

U.S. PATENT DOCUMENTS

| | | | |
|---|---|---|---|
| 2,199,309 | 4/1940 | Freudenberg | 65/14 |
| 3,215,514 | 11/1965 | Levecque et al. | 65/6 |
| 3,928,009 | 12/1975 | Perry | 65/14 |
| 4,105,425 | 8/1978 | Nielsen | 65/14 |
| 4,119,421 | 10/1978 | Alenrot et al. | 65/14 |

FOREIGN PATENT DOCUMENTS 77978  1/1951  Norway ................................. 65/14

Primary Examiner—Robert L. Lindsay, Jr.
Attorney, Agent, or Firm—Ronald C. Hudgens; Philip R. Cloutier; Ted C. Gillespie

[57] ABSTRACT

Apparatus for forming fibers of mineral material comprises a spinner for centrifuging the material into primary fibers and a plurality of blowers positioned circumferentially of the spinner to further attenuate the primary fibers into secondary fibers, where the blowers are substantially cylindrical gas discharge conduits adapted to impart swirling motion to the gas discharged therefrom.

6 Claims, 6 Drawing Figures

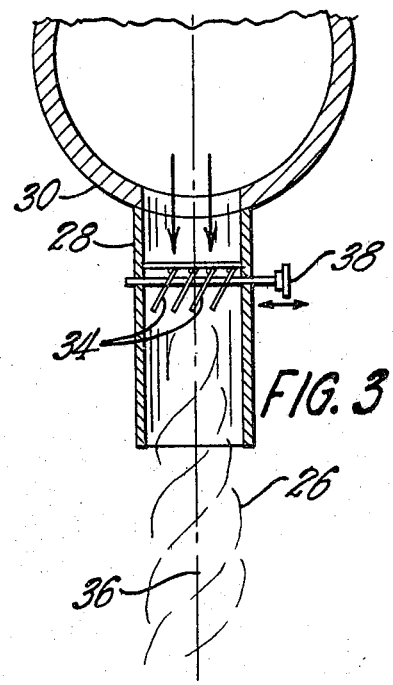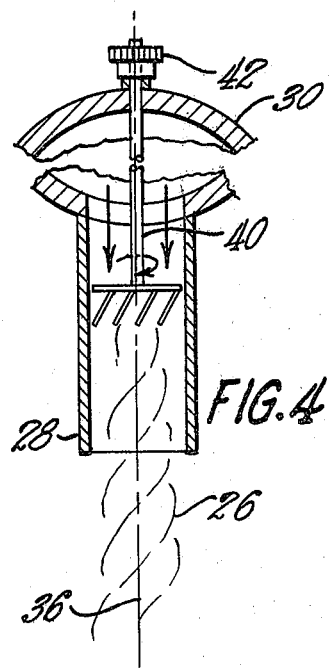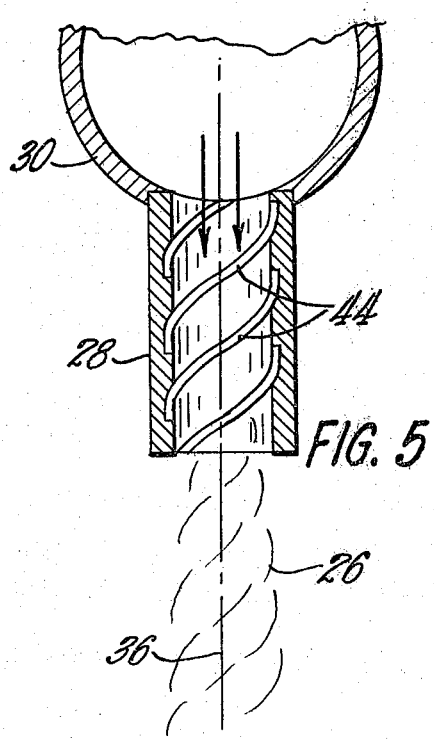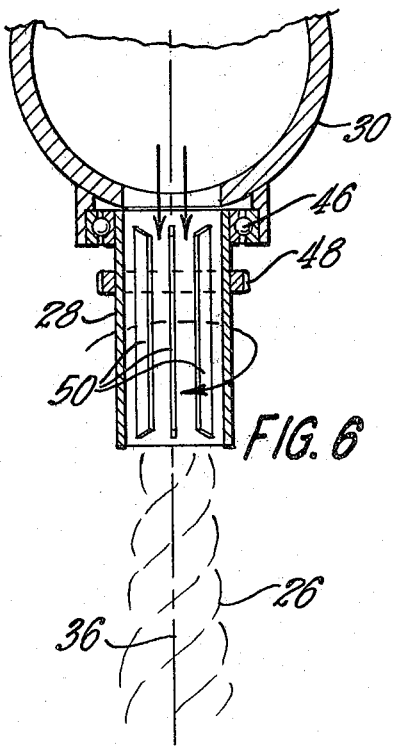

METHOD AND APPARATUS FOR FORMING MINERAL FIBERS

TECHNICAL FIELD

This invention pertains to forming fibers from molten mineral material, such as forming glass fibers from molten glass. In one of its more specific aspects, this invention relates to centrifuging molten mineral material to form primary fibers, and further attenuating the primary fibers into secondary fibers by the action of a flow of gases.

BACKGROUND OF THE INVENTION

A common practice in forming fibers of mineral material is to pass the material in a molten state through orifices in the peripheral wall of a centrifuge or spinner to create primary fibers. Thereafter, the primary fibers are further attenuated into a veil of secondary fibers of smaller diameter by air drag attenuation from a flow of gases discharged downwardly. It is known in the prior art that the flow of gases can have a high velocity in order to increase the air drag attenuation of the primary fibers into the secondary fibers. It is also known that the air drag attenuation applied to the primary fibers by the flow of gases can be greatly increased by creating some turbulence in the flow of gases.

A problem with the fiber-forming apparatus of the prior art is that the blowers used for secondary attentuation of the primary fibers into secondary fibers consume large amounts of energy since the air flows from such prior art blowers are relatively non-turbulent and, therefore, are relatively inefficient as attenuation mechanisms. Also, the blowers of the prior art do not enable the degree of turbulence to be controlled accurately. The apparatus and method of this invention are directed towards the solution of the above problems.

SUMMARY OF THE INVENTION

According to this invention, there is provided apparatus in which a spinner is adapted to centrifuge molten mineral material into primary fibers and in which a plurality of blowers is positioned circumferentially of the spinner to further attenuate the primary fibers into secondary fibers, where each of the blowers comprises a substantially cylindrical gas discharge conduit adapted to impart a swirling motion to gas discharged therefrom.

In one of its embodiments, vanes are mounted within the cylinders to impart the swirling motion to the gas.

In another of its embodiments, the vanes are mounted for rotation about the longitudinal axes of the conduits, and means for rotating the vanes are provided.

In another of its embodiments, means for controlling the pitch of the vanes are provided.

In another of its embodiments, the interior surfaces of the conduits are adapted with helical grooves to impart the swirling motions to the gas.

In another of its embodiments, the conduits are mounted for rotation about their longitudinal axes.

DESCRIPTION OF DRAWINGS

The invention will be more easily understood if explained in conjunction with the attached drawings in which:

FIG. 3 is a cross section elevational view of a gas discharge conduit according to the invention.

FIGS. 4, 5 and 6 are modifications of the gas discharge conduit shown in FIG. 3, these modifications illustrating the configuration of various means for imparting the swirling motion to the gas discharged from the gas discharge conduits.

DESCRIPTION OF THE INVENTION

Figure 1:
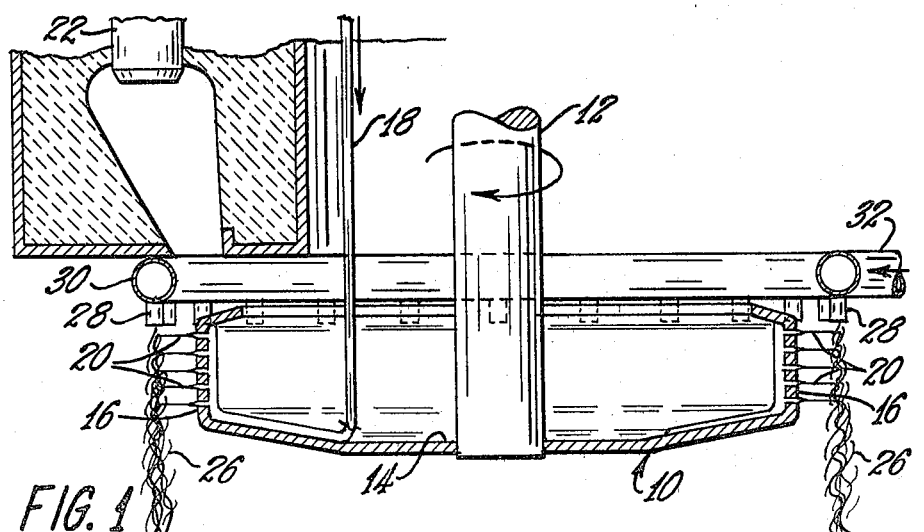
FIG. 1 is an elevational view of fiber-forming apparatus according to the principles of this invention.

As shown in FIG. 1, spinner 10 is mounted for rotation on quill 12, and can be comprised of spinner bottom wall 14 and orificed peripheral wall 16. Molten glass stream 18 drops into the bottom of the spinner and flows outwardly and upwardly to the spinner peripheral wall through which it passes to form primary fibers 20. The primary fibers can have a diameter within the range of from about 15 to about 25 microns, although the principles of the invention will apply for primary fibers having greater or lesser diameters. The primary fibers can be maintained in a plastic, attenuable condition by the heat supplied from annular burner 22.

Figure 2:
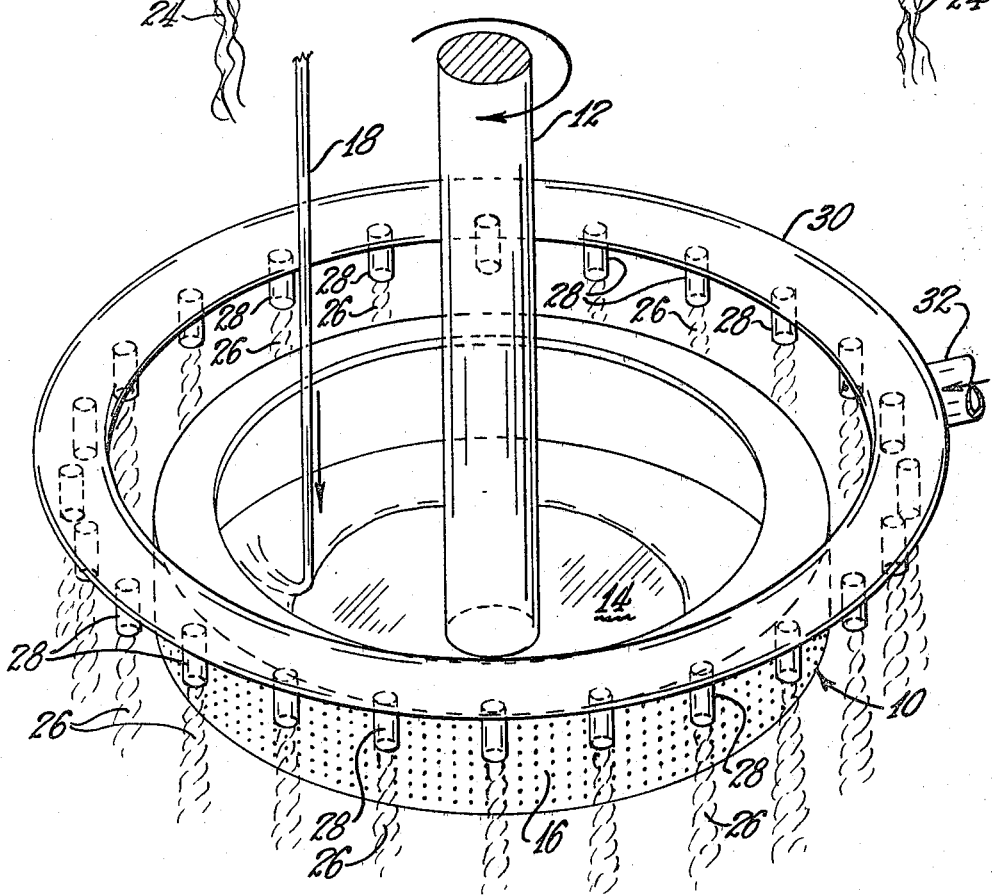
FIG. 2 is a perspective view of the spinner and blowers shown in FIG. 1.

The primary fibers are further attenuated into secondary fibers 24 by the air drag of swirling gases 26 discharged from gas discharge conduits 28. As can be seen in FIG. 2, the gas discharge conduits can be supplied with a gas, such as air by annular manifold 30, which can itself be supplied from a source, not shown, via feeder duct 32.

Referring now to FIG. 3, vanes 34 are shown positioned within the discharge conduit. The vanes are mounted at angles to longitudinal axis 36 of the conduit, and impart the swirling motion to the air passed through the discharge conduit, thereby producing the swirling gases for air drag attenuation. As shown, the vanes can be mounted with any suitable adjustment mechanism, such as rod 38, for controlling the pitch of the vanes. By controlling the pitch of the vanes, the degree of swirl or turbulence of the gases discharged can be controlled.

Referring now to FIG. 4, it is shown that the vanes can be mounted for rotation within the discharge conduit on shaft 40, which is coincident with the longitudinal axis of the conduit. The shaft and the vanes can be driven by any suitable means, such as gear 42 mounted on the shaft and driven by an annular gear wheel, not shown. The rotation of the vanes acts like a propeller in driving air through the conduit and discharging the air in a swirling, turbulent condition for air drag attenuation of the glass fibers. The amount of swirl imparted to the air passing through the discharge conduit can be controlled by controlling the speed of rotation of the vanes.

Referring now to FIG. 5, there is shown a discharge conduit containing helical grooves 44 on its inner surface. In this embodiment, air passing through the discharge conduit is given a swirling motion as it flows along the grooves to produce the swirling gases for air drag attenuation.

Referring now to FIG. 6, there is shown the discharge conduit rotatably mounted from the manifold on bearings 46. The discharge conduit can be rotated about its longitudinal axis by any suitable means such as gear 48 driven by a suitable drive wheel, not shown. The rotation of the discharge conduit imparts a swirling motion to the air passing through the discharge conduit. The amount of swirling imparted to the air can be controlled by controlling the speed of rotation of the discharge conduit. The interior of the discharge conduit can be adapted with vanes 50 which can be mounted to facilitate the swirling of the air passing through the discharge conduit.

It is to be understood that individual elements of the various embodiments of the invention can be combined for greater control of the degree of turbulence of the gases discharged from the discharge conduits.

EXPLOITATION IN INDUSTRY

This invention will be found to be useful in the formation of fibers from molten glass for such uses as glass fiber thermal insulation products and glass fiber acoustical insulation products.

We claim:

1. Apparatus of the type in which a spinner is adapted to centrifuge molten mineral material through the orificed spinner peripheral wall into primary fibers and a plurality of blowers is positioned circumferentially of said spinner to further attentuate said primary fibers into secondary fibers, the improvement being each of said blowers comprising a substantially cylindrical gas discharge conduit having means positioned therein to impart a swirling motion to gas discharged therefrom.

2. The apparatus of claim 1 in which said means comprises a plurality of vanes mounted within said conduits to impart said swirling motion to said gas.

3. The apparatus of claim 2 in which said vanes are mounted for rotation about the longitudinal axes of said conduits, and further comprising means for rotating said vanes.

4. The apparatus of claims 2 or 3 comprising means for controlling the pitch of said vanes.

5. The apparatus of claim 1 in which said means comprises helical grooves positioned on the interior surfaces of said conduits to impart said swirling motion to said gas.

6. Apparatus of the type in which a spinner is adapted to centrifuge molten mineral material through the orificed spinner peripheral wall into primary fibers and a plurality of blowers is positioned circumferentially of said spinner to further attenuate said primary fibers into secondary fibers, the improvement being each of said blowers comprising a substantially cylindrical gas discharge conduit which is mounted for rotation about its longitudinal axis to impart a swirling motion to gas discharged therefrom.

* * * * *